March 10, 1964
D. G. SPRIGINGS
3,124,226
CURRENT COLLECTOR ARM
Filed Nov. 8, 1960
4 Sheets-Sheet 1
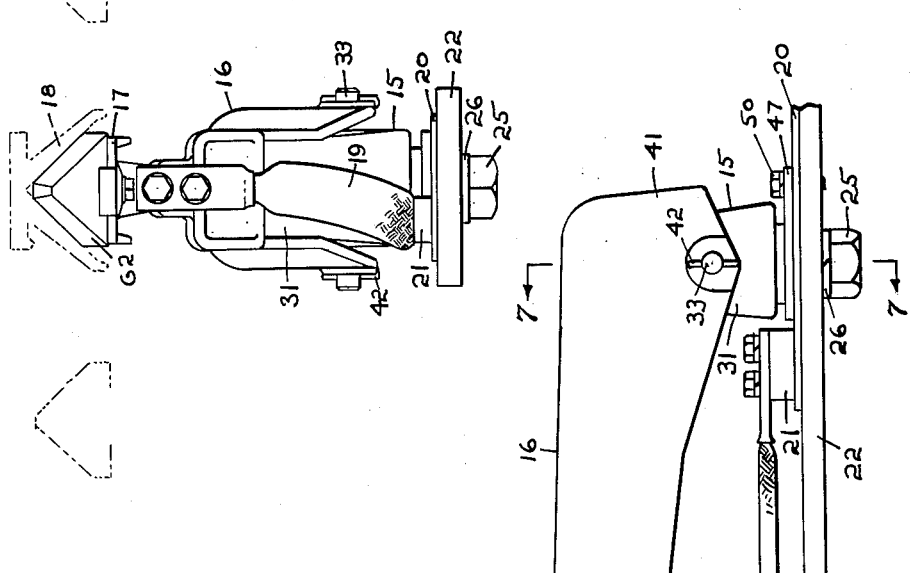
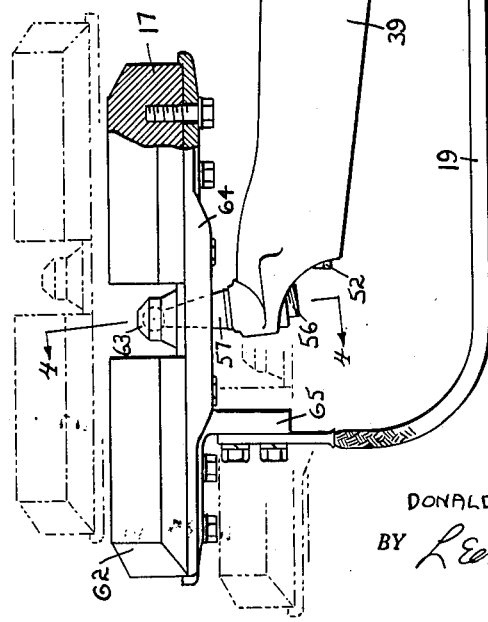
INVENTOR.
DONALD G. SPRIGINGS
BY
ATTORNEY.

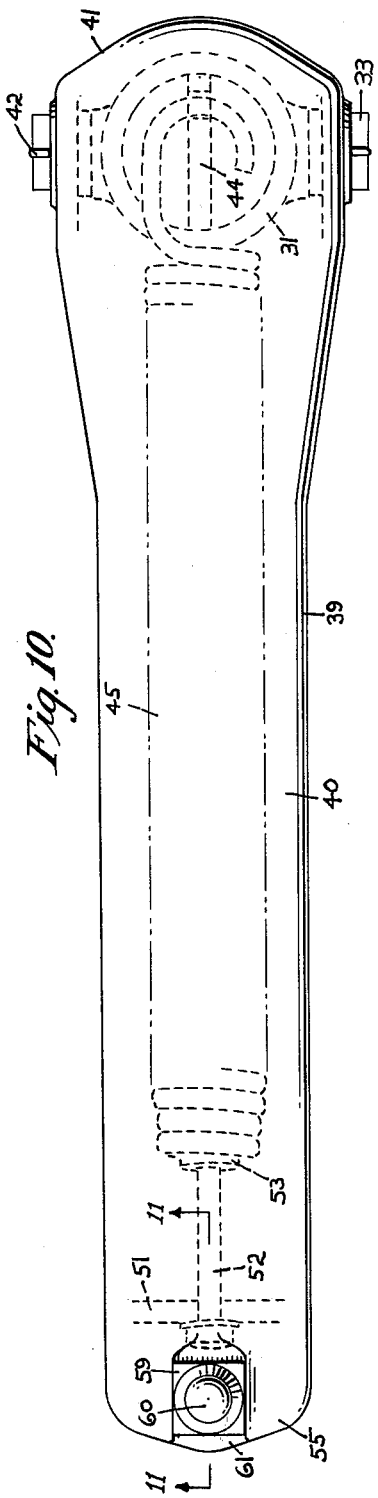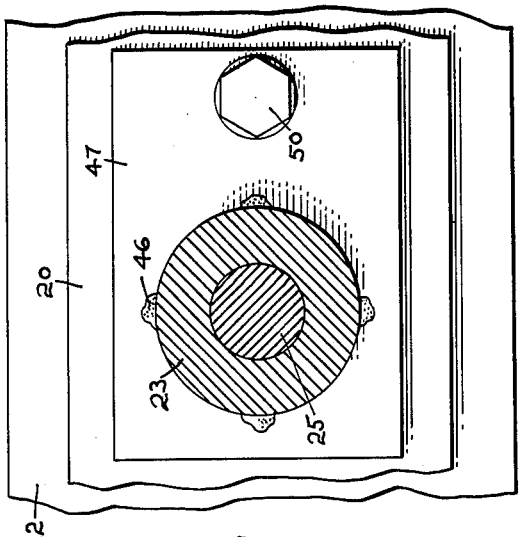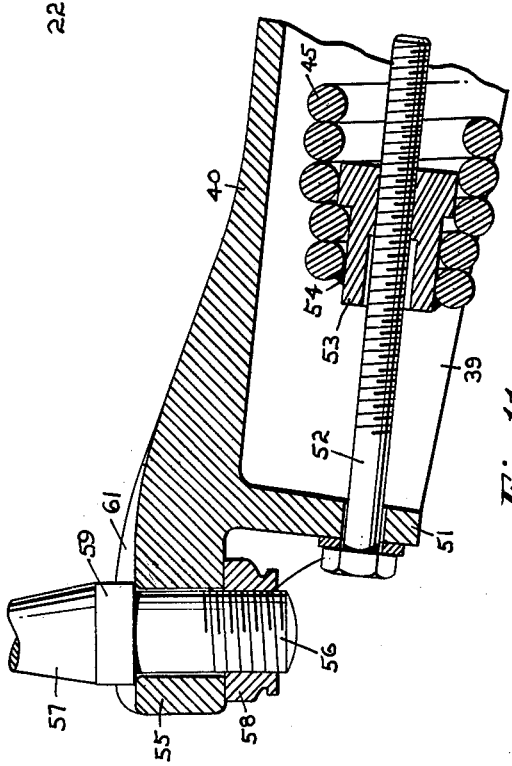

March 10, 1964   D. G. SPRIGINGS   3,124,226
CURRENT COLLECTOR ARM
Filed Nov. 8, 1960   4 Sheets-Sheet 3
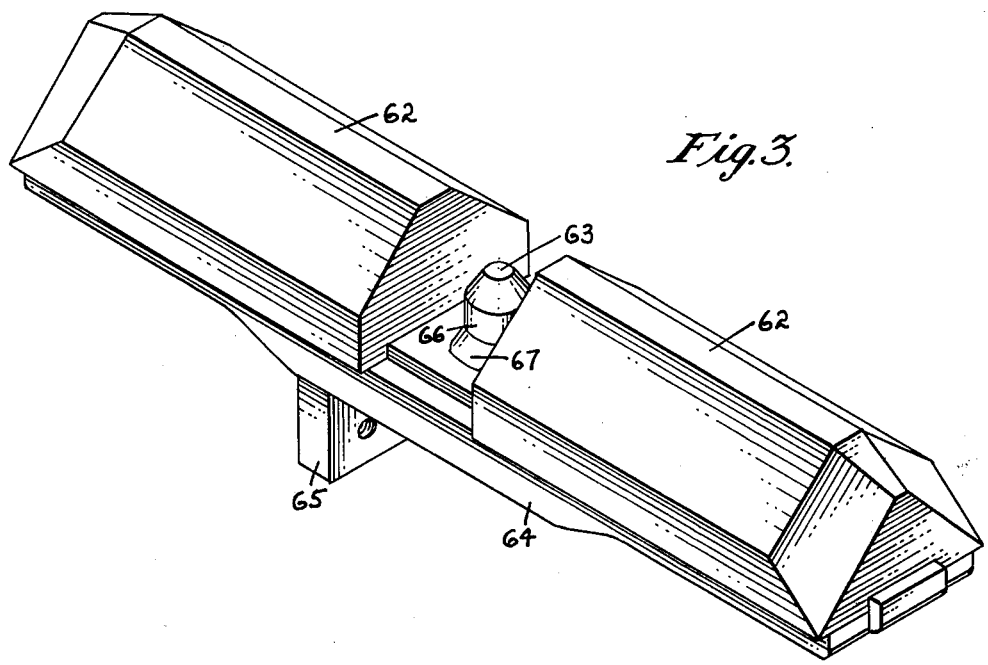
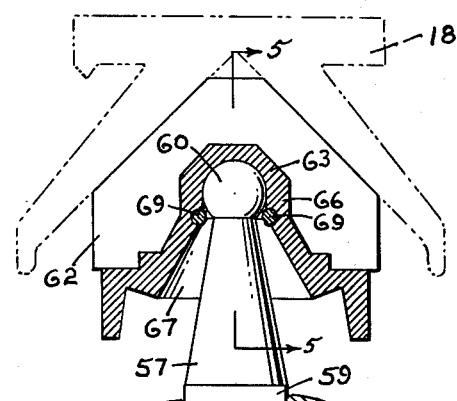
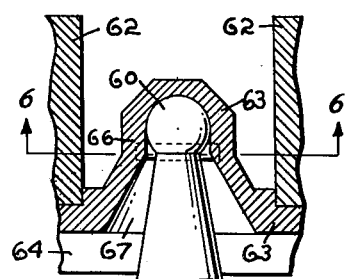
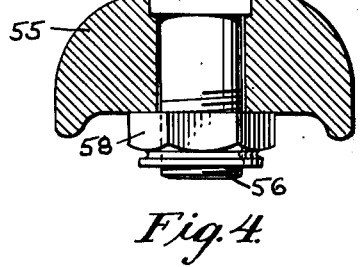
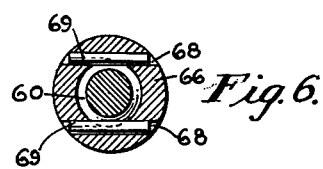
INVENTOR.
DONALD G. SPRIGINGS
BY
ATTORNEY.

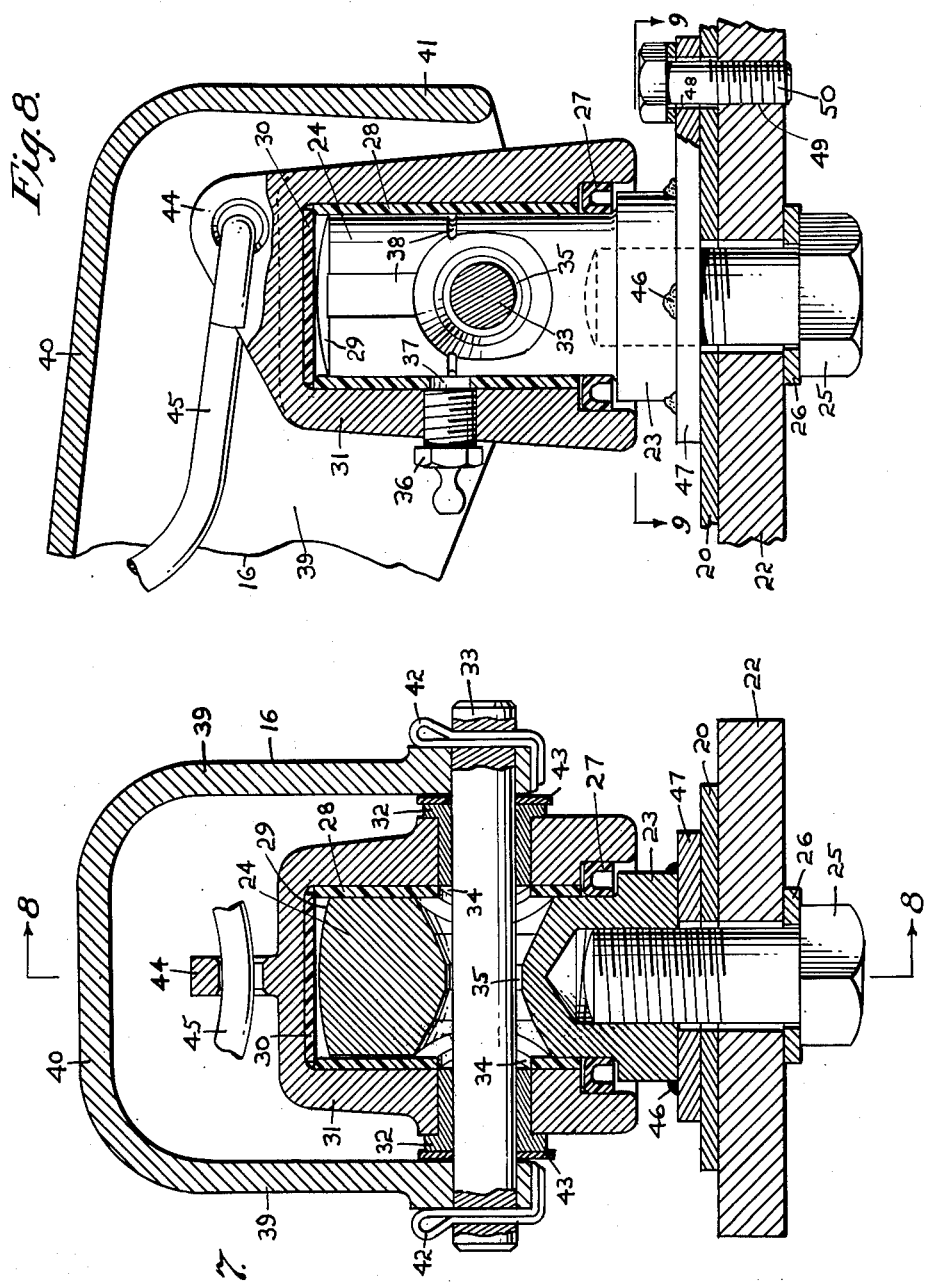

United States Patent Office 3,124,226
Patented Mar. 10, 1964

3,124,226
CURRENT COLLECTOR ARM
Donald G. Sprigings, Lynchburg, Va., assignor to H. K. Porter Company, Inc., Philadelphia, Pa., a corporation of Delaware
Filed Nov. 8, 1960, Ser. No. 67,981
6 Claims. (Cl. 191—59.1)

This invention relates generally to apparatus for collecting electric current from a power transmission conductor and more particularly to such apparatus mounted upon a mobile unit and operating in contact with the power transmission conductor.

A principal object of the present invention is to provide apparatus having a collector shoe operating in contact with the power transmission conductor and wherein the electric current collected by the apparatus bypasses the means carrying the collector shoe.

Another principal object of the present invention is to provide such apparatus wherein the means carrying the collector shoe and bypassed by the electric current includes an arm mounting the contact shoe, and means covered by the arm and protected thereby against the elements and operating to adjustably yieldably bias said arm and shoe upwardly into contact with the power transmission conductor.

A further important object of the invention is to provide such apparatus wherein the contact shoe carrying current collector arm includes indexing means for mounting the arm to a mobile unit so that the arm is positioned for symmetrical lateral throw in opposite directions from the longitudinal center line of the power conductor.

Still another object of the present invention is to provide such apparatus wherein the means carrying the collector shoe and bypassed by the electric current includes a thrust type swivel joint by means of which the same is mounted upon the mobile unit.

Yet another object of the present invention is to provide such apparatus wherein the swivel joint aforesaid is self-flushing, whereby excessive lubricant supplied thereto under pressure is automatically expelled therefrom.

Yet a further object of the present invention is to provide such apparatus wherein the collector shoe is mounted upon the collector arm for universal type movement and includes simple but effective means for positively retaining the shoe upon the collector arm, whereby the contact shoe operates in contact and accurate alignment with the power transmission conductor regardless of horizontal, vertical or angular shifting movement of the swivel joint relative to the power transmission conductor.

And a still further object of this invention is to provide such apparatus which affords trouble free performance and reduces the problem of maintenance when replacement of shoes or other parts, or other servicing is necessary.

Further objects and advantages of the present invention will appear more fully hereafter, it being understood that the present invention consists in the combination, construction, location and relative arrangement of parts, as will appear more fully hereinafter, as shown on the accompanying drawings and as finally pointed out in the appended claims.

In the accompanying drawings:

FIGURE 1 is a side elevation of apparatus constructed in acocrdance with and embodying the principles of the present invention, certain areas being broken away and sectioned;

FIGURE 2 is an end elevation of the apparatus of FIGURE 1 viewed from the left;

FIGURE 3 is a top perspective view of the collector shoe illustrated in FIGURE 1;

FIGURE 4 is an enlarged vertical section on line 4—4 of FIGURE 1;

FIGURE 5 is a vertical section on line 5—5 of FIGURE 4;

FIGURE 6 is a plan section on line 6—6 of FIGURE 5;

FIGURE 7 is an enlarged vertical section on line 7—7 of FIGURE 1;

FIGURE 8 is a vertical section on line 8—8 of FIGURE 7;

FIGURE 9 is a plan section on line 9—9 of FIGURE 8;

FIGURE 10 is an enlarged plan view of the collector arm of FIGURE 1 with the collector shoe removed and the arm internal biasing spring shown in dashed line; and FIGURE 11 is an enlarged vertical fragmentary view of the collector arm taken on line 11—11 of FIGURE 10.

As best seen in FIGURES 1 and 2, the apparatus constructed in accordance with and embodying the principles of the present invention comprises an upright swivel fitting assembly 15, a horizontally extending collector arm assembly 16 that projects laterally from the swivel fitting assembly 15, and a shoe assembly 17 that is operatively mounted upon the collector arm assembly 16. The shoe assembly 17 is adapted for contact with an electric power conductor rail 18, and from the shoe assembly 17 depends a braided flexible shunt strap 19. Electric power from the conductor 18 and shoe assembly 17 is conducted through the shunt 19 to a buss bar 20 via a terminal block 21 mounted with the swivel fitting assembly 15 and buss bar 20 to a mounting base in the form of a plate 22 which is carried by the moible unit (not shown) to which the electric power is supplied, for example, a traveling crane.

As best seen in FIGURES 7 and 8, the swivel fitting assembly 15 includes a vertically extending preferably stainless steel spindle member that has a lower end portion 23 and a main body upper portion 24 which in plan transverse section is circular and somewhat smaller than the lower end portion 23. The spindle is provided with a threaded hole extending axially upward from the bottom for receiving an anchor bolt 25 and lockwasher 26 which secure the spindle member to the buss bar 20 and mounting plate 22 as shown. Fitted over the spindle main body portion 24 and seated upon the spindle lower end portion 23 is a conventional flexible sealing ring 27 made for example of rubber. Above the latter is a cylindrical electrical insulator sleeve 28 that is fitted over the spindle main body portion 24. The top of the spindle member is rounded, as at 29, so as to form a low friction thrust member, and overlying this rounded top is an insulator disc 30. The cylindrical sleeve 28 and the disc 30 preferredly are made of a substance which is also a suitable bearing material, such as nylon.

Fitted over the spindle member is a preferredly cast iron jacket member 31 that is center bored for a close fit about the sleeve 28 and counterbored for a similar fit about the sealing ring 27. Diametrically opposite side wall areas of the jacket member 31 are fitted respectively with a pair of bronze bushings 32—32, and a horizontally extending shaft 33 is journalled respectively in these bushings. The portion of the shaft 33 intervening the bushings 32—32 extends freely through the sleeve 28 and the spindle member. It will be observed that the apertures, designated 34—34, formed in the sleeve 28 and the transverse bore, designated 35, formed in the spindle member are all large in diameter, relative to the diameter of the shaft 33.

Threaded into the wall of the jacket member 31 is a grease fitting 36 that communicates, through an aperture 37 which is formed in the sleeve 28, with a grease channel 38. The latter extends circumferentially about and vertically to the top of the spindle member, as shown.

As best seen in FIGURES 8 and 9, welded to the bottom of the spindle member, as at 40, is an index plate 47, apertured to allow passage therethrough of the anchor bolt 25 and extending rearward of the collector arm 16. The rearward extending portion of the index plate 47 is also apertured as at 48 to overlie a hole in the buss bar 20 and a threaded hole 49 in the mounting plate 22 so that a bolt 50 may be projected downward thereinto to secure the swivel fitting assembly 15 to the mounting plate in a fixed predetermined alignment position. It will be appreciated that the spindle transverse bore 35 through which the shaft 33 is projected should be oriented precisely perpendicularly to the center line of the power transmission conductor rails 18 because the collector arm 16 will normally experience lateral shifts during operation which result in rotations of the shaft 33 about the spindle. The collector arm can only rotate through a fixed maximum angle relatively to the spindle before the shaft 33 contacts the walls of the spindle bore 35 and is restrained from further rotation. When the shaft is properly centered within the spindle bore the lateral shifts of the collector arm normally encountered will not cause such contact. Therefore, in order to preclude such contact it is important that the spindle be oriented relative to the conductor rail 18 so that the arm 16 may be rotated equally in opposite directions about the rail center line. Since the mounting plate 22 is fixed to the mobile unit and can be precisely aligned relative to the center line thereof, proper alignment of the spindle is automatically accomplished when the collector arm is secured to the mounting plate by the bolts 25 and 50. Thus, the index plate 47 eliminates the need for resetting the collector arm after making a trial run with the mobile unit to check for inadequate rotational ability of the arm in one direction or the other.

The arm assembly 16 includes a preferredly elongated member of inverted U-shape in transverse section. Longitudinally extending opposite side walls 39—39 of this member are interconnected by a longitudinally extending top wall 40 and a transversely extending rear end wall 41. The end of the arm member adjacent the latter is of somewhat enlarged internal size and positioned in covering relation to the jacket member 31. The opposite end portions of the shaft 33 project through opposed areas of the side walls 39—39 and are suitably provided with a pair of securing cotter pins 42—42 and a pair of washers 43—43.

Extending upright from the top of the jacket member 31 is a projection 44 to which is anchored one end portion of a tension coil spring 45. Referring now also to FIGURES 10 and 11, it is seen that this coil spring extends horizontally under the arm top wall 40 toward the arm front wall 51 where the opposite end of the coil spring 45 is adjustably anchored to a longitudinally extending bolt 52 projected rearward through the arm front wall into threaded engagement with a plug 53 disposed within and secured by tack welds 54 to the spring end. Rotation of the bolt 52 shifts the plug 53 in one direction or the other and thus permits adjustment and readjustment of the spring tension as desired.

Considering now FIGURE 4 in addition to FIGURES 10 and 11, it is observed that the top wall 40 of the collector arm 16 extends somewhat forward beyond the arm front wall 51 and terminates in a substantially vertically apertured boss 55, through which is projected downward the threaded end 56 of a steel ball-joint bolt 57, the end 56 being secured as by the nut 58. The ball-joint bolt 57 includes a central portion 59 of square transverse section and tapers inward upwardly therefrom to a reduced diameter neck surmounted by a ball head termination 60 of larger diameter than the neck. The top of the boss 55 of the collector arm 16 is observed to be formed with a depressed seat area 61 of substantially the same width as the square central portion 59 of the ball-joint bolt 57 so that the square section 59 draws down and seats in the depression 61 as the nut 58 is tightened on the bolt end 56. The seating of the bolt section 59 prevents rotation of the bolt 57 as the nut 58 is pulled up tight.

As best seen in FIGURES 1 to 4, the shoe assembly 17 includes a pair of elongated, longitudinally spaced, contact shoes 62—62 of generally inverted V-shape in transverse section secured down upon a shoe assembly base plate member 64, which latter includes a ball-joint-bolt ball socket intermediate section 63 and a depending shunt strap terminal block 65. As best seen in FIGURES 4 to 6, the ball socket section 63 is generally bell shaped on its inside surface so that it conformingly seats upon the ball head 60 of the ball-joint bolt 57, the bell top region extending substantially cylindrically downward as at 66 to the ball-joint bolt neck region before flaring outward as at 67. The bell shaped ball socket 63 is provided with a pair of horizontal through-bores 68 located at the point where the bell cylindrical portion 66 and bell flared portion 67 intersect. These bores 68 each open into the bell socket interior along one side and each receive a pin 69 after the ball socket 63 has been seated upon the ball head 60, the pins 69 being of sufficient diameter so that a longitudinally extending side of each projects into the socket and underlies the ball head 60. Thus, with the pins 69 installed, the shoe assembly 17 is mechanically secured upon the ball-joint bolt 57 while being free to rotate universally just as though the pins were not there. This pin type interlock prevents the possibility of throwing the shoe assembly off of the ball-joint bolt should the shoe somehow escape from the conductor rail 18, a not impossible occurrence.

It will be observed that the spindle and jacket members are electrically insulated from one another effectively by the cylindrical sleeve 28, disc 30, sealing ring 27, and free passage of the shaft 33 through the spindle member, in consequence of which passage of electric current through the collector arm assembly 16 to the buss bar 20 is precluded. As indicated hereinbefore, electric power from the conductor 18 is conducted to the buss bar 20 through the contact shoes 62, base plate 64, and shunt strap 19.

Preferredly, a lubricant having high dielectric properties is injected into the swivel fitting assembly 15 through the grease fitting 36. The lubricant under pressure is forced through the grease channel 38 to the top of the spindle member and then down between the spindle member and the sleeve 28 to the sealing ring 27. Of course, the lubricant fills the space around the shaft 33, between the bushings 32—32, and excess lubricant is automatically flushed from the swivel fitting assembly 15 when the sealing ring 27 yields, due to the pressure exerted thereon by the lubricant. In addition to serving as a dielectric agent, the disc 30 overlying the spindle member serves to enable the collector arm assembly 16, jacket member 31 and shaft 33 to move freely as a unit about the spindle member, even when the swivel fitting assembly 15 is dry or devoid of any lubricant. In this connection, at no time during the movement aforesaid does the shaft 33 come into contact with the spindle member.

The electric current, as indicated hereinbefore, bypasses the swivel fitting assembly 15, the joint upon which the collector arm assembly 16 moves, in consequence of which this joint deteriorates much less rapidly than it would otherwise. Any welding together of the spindle and jacket members is precluded, and therefore friction is reduced. Erosion and/or galvanic corrosion between bearing surfaces of different metals, which action is usually accelerated in the presence of an electric current, is eliminated, and there is no electrolysis between the parts.

The coil spring 45 is effectively protected against falling contaminants and from ice and sleet by the overlying arm. In addition, in those constructions wherein the electric current is passed through the arm assembly 16, the spring is heated and thereby annealed, in consequence of which it loses its resiliency.

In the operation of the apparatus, the vertical distance between the swivel fitting assembly 15 and the conductor 18 may vary and/or the swivel fitting assembly 15 may shift laterally relative to the vertical median plane of the conductor 18 during travel of the crane or other mobile unit. In this event, the collector arm assembly 16 automatically adjusts by pivoting about the shaft 33 and/or the spindle member, as required. Simultaneously, the shoe assembly 17 turns freely and tilts fore and aft and/or to either side upon the ball-joint bolt head 60 as required, to compensate for any change in the angular relation between the bolt 57 and the conductor 18, in consequence of which the contact shoes 62 are constantly in full, effective contact with the undersurfaces of the conductor 18.

The proximity of the connection between the arm and shoe assemblies to the conductor 18 is of prime importance because the greater the effective vertical distance, the greater is the tendency of the shoe assembly 17 to tilt fore and aft as it is moved in contact with the undersurface of the conductor 18. The utilization of a ball and socket type connection inherently lends itself to a construction wherein the effective vertical distance between the connection and the conductor 18 can be held to a minimum.

Whenever, the shoe assembly 17 is not engaged with the conductor 18, the collector arm assembly 16 automatically swings upwardly under the influence of the tension spring 45, this movement being limited by engagement of the transversely extending rear wall 41 of the arm assembly 16 with the jacket member 31.

The ease with which the apparatus is disassembled for servicing and repairs is of prime importance. The shoe assembly 17 may be disconnected from the collector arm assembly 16 by merely removing the pins 69 and lifting the shoe from the ball-joint bolt 57. The arm assembly 16 may be disconnected from the swivel fitting assembly 15 by merely removing the shaft 33 and disengaging the coil spring 45 from the jacket member 31. The jacket member 31 may now be lifted from the spindle member, or, if desired, the base assembly A may be disengaged as a unit from the buss bar 20 and mounting plate 22 by merely removing the bolts 25 and 50.

It will be understood, of course, that the present invention as hereinbefore described and as shown in the accompanying drawings is susceptible of various changes and modifications which may be made from time to time without departing from the general principles of reap spirit of the invention, and accordingly, it is intended to claim the same broadly, as well as specifically as indicated by the appended claims.

What is claimed as new and useful is:

1. In apparatus for collecting current from an electric power line for transmission thereof to a mobile unit, an upright base having a pair of complementary parts electrically insulated from one another and movable relative to one another about the vertically extending principal axis of said base, an arm having a top wall and a pair of spaced apart sidewalls depending therefrom with a front wall bridging between the said sidewalls, said arm extending laterally from said base and connected proximate its rear end to one of said parts for pivotal movement about a horizontal axis and for pivotal movement about said vertically extending principal axis, a contact shoe mounted upon the free end portion of said arm and adapted for operation in contact with the power line throughout the range of pivotal movement of said arm, an elongated coil tension spring anchored at one end at a point above the horizontal axis for arm pivotal movement to the one of said complementary parts connecting to said arm and extending forward beneath and between the arm top wall and sidewalls respectively toward the arm front wall, a threaded bore plug disposed within and secured to the forward extending end of the said coil spring with the threaded bore substantially axially aligned with the coil spring long axis, a rearwardly extending threaded bolt projected through the arm front wall and into threaded engagement with the plug bore for variably stretching the spring to adjust the tension thereof to bias said arm and contact shoe upwardly for contact of the latter with the undersurface of said power line, and a shunt depending from said contact shoe for conducting the electric current around said arm, whereby the latter is bypassed.

2. An electric utility current collector power contact shoe for conducting current from an electric power conductor line to the utility comprising in combination, an elongated contact shoe adapted for upward biasing into contact with the undersurface of the power conductor line, said contact shoe including a ball joint socket for receiving an underlying ball headed shoe-supporting member, a shoe supporting member terminating at its upper end in a ball head seated within the contact shoe socket whereby the shoe is supported for universal movement on said ball head, and retaining means carried by said shoe and disposed at least partially in directly underlying relationship to the ball head of the shoe supporting member to thereby prevent withdrawal of the ball head from the shoe socket and preclude dislodgement of the shoe from the shoe supporting member.

3. An electric utility current collector power contact shoe comprising in combination, an elongated contact shoe adapted for upward biasing into contact with the undersurface of a power conductor line, said contact shoe including a curved-top ball-joint socket for receiving an underlying ball headed shoe supporting member, said socket being generally bell shaped and including a substantially cylindrically downward extending top region joined to a lower region flaring conically outward, a substantially vertically oriented shoe supporting member tapering upwardly inward to a neck region surmounted by a ball head of larger diameter than that of the neck, the contact shoe socket being seated upon the supporting member ball head with the latter disposed within the socket top region for universal movement on said ball head, and retaining means carried by said shoe and projecting into said socket in at least partially underlying relationship to said ball head to prevent withdrawal of the ball head from the socket and thereby preclude dislodgement of the shoe from the shoe supporting member.

4. An electric utility current collector power contact shoe comprising in combination, an elongated contact shoe adapted for upward biasing into contact with the undersurface of a power conductor line, said contact shoe including a curved-top ball-joint socket for receiving an underlying ball headed shoe supporting member, said socket being generally bell shaped and including a substantially cylindrically downward extending top region joined to a lower region flaring conically outward, a substantially vertically oriented shoe supporting member tapering upwardly inward to a neck region surmounted by a ball head of larger diameter than that of the neck, the contact shoe socket being seated upon the supporting member ball head with the latter disposed within the socket top region for universal movement on said ball head, said socket including a pair of parallel horizontal bores disposed diametrically across the socket from one another and each opening along one side thereof into the socket at the juncture of the socket top region and lower region, and a removable close fitting pin disposed within each bore so that a longitudinally extending side portion of each pin projects into the socket through the bore side opening and non-engagingly underlies the ball head of the shoe supporting member, whereby the ball head is prevented from withdrawal out of the socket and dislodgement of the shoe from its supporting member is precluded.

5. Apparatus for collecting electric current from a power line for transmission thereof to a mobile unit, comprising in combination, a mounting base securable to the mobile unit, an arm coupled to and extending freely laterally from said base by means providing for vertical and horizontal pivotal movement relative to said base, a contact shoe supporting member secured to and extending substantially upward from the free end of said arm, and a contact shoe mounted upon said shoe supporting member by means comprising a universal joint, said contact shoe supporting member and the free end of said arm to which it is secured including complementary parts of a keyed interlock which when interfitted prevent relative rotational motion between said shoe supporting member and arm, said shoe supporting member comprising a ball headed bolt threaded at its lower end and having an intermediate portion of rectangular shape in horizontal cross-section, the free end of said arm having a vertical bore therethrough from top to bottom downward through which the threaded lower end of the bolt is projected and secured on the underside of the arm with a nut, the horizontal rectangular cross-section intermediate portion of said bolt seating down upon said arm and into a receiving channel formed in the arm top wall, said arm channel and said bolt rectangular cross-section intermediate portion together comprising the said keyed interlock.

6. Apparatus securable to a mobile unit for collecting electric current from a power line for transmission thereof to the mobile unit, comprising in combination, a mounting base fixedly securable to the mobile unit for securing the apparatus to the mobile unit, a pivot member securable to and extending upward from said base, an arm coupled to and extending laterally from said pivot member by means providing for restricted horizontal pivotal movement of said arm relative to said pivot member, a contact shoe mounted upon said arm for universal movement relative thereto, an index plate fixedly secured to said pivot member, said index plate and mounting base containing two pairs of alignable apertures which when aligned orient the said pivot member so that said arm is symmetrically horizontally pivotable within its restricted range about a predetermined center line of said base, and means for fixedly securing said index plate and mounting base to one another when said apertures therein are aligned.

References Cited in the file of this patent

UNITED STATES PATENTS

| | | |
|---|---|---|
| 761,565 | Walker | May 31, 1904 |
| 1,060,341 | Jewett | Apr. 29, 1913 |
| 1,447,217 | Lincoln | Mar. 6, 1923 |
| 1,487,311 | Bower | Mar. 18, 1924 |
| 1,864,026 | Moore | June 21, 1932 |
| 1,918,837 | Dippman | July 18, 1933 |
| 1,918,854 | Mead | July 18, 1933 |
| 2,756,289 | Taylor | July 24, 1956 |
| 2,782,450 | Nesson | Feb. 26, 1957 |
| 3,047,681 | Dehn | July 31, 1962 |
| 3,060,283 | Mageoch et al. | Oct. 23, 1962 |

FOREIGN PATENTS

| | | |
|---|---|---|
| 354,521 | Italy | Nov. 25, 1937 |
| 512,359 | Great Britain | Sept. 1, 1939 |
| 839,139 | Great Britain | June 18, 1959 |

OTHER REFERENCES

Bock et. al., German Application 1,059,785, printed June 18, 1959 (Kl. 63c 82).